(No Model.) 2 Sheets—Sheet 2.
J. J. PFENNINGER.
BAKE OVEN.
No. 523,005. Patented July 17, 1894.
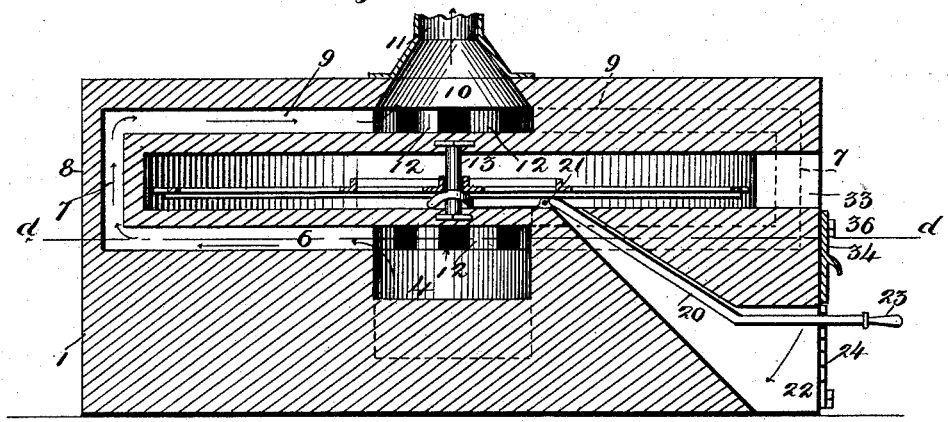
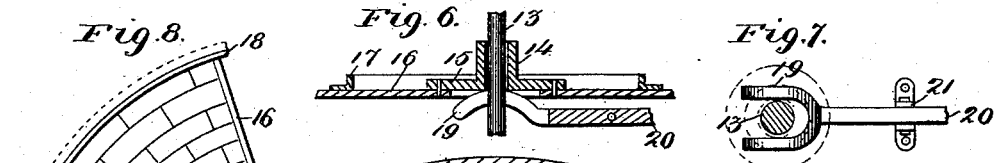
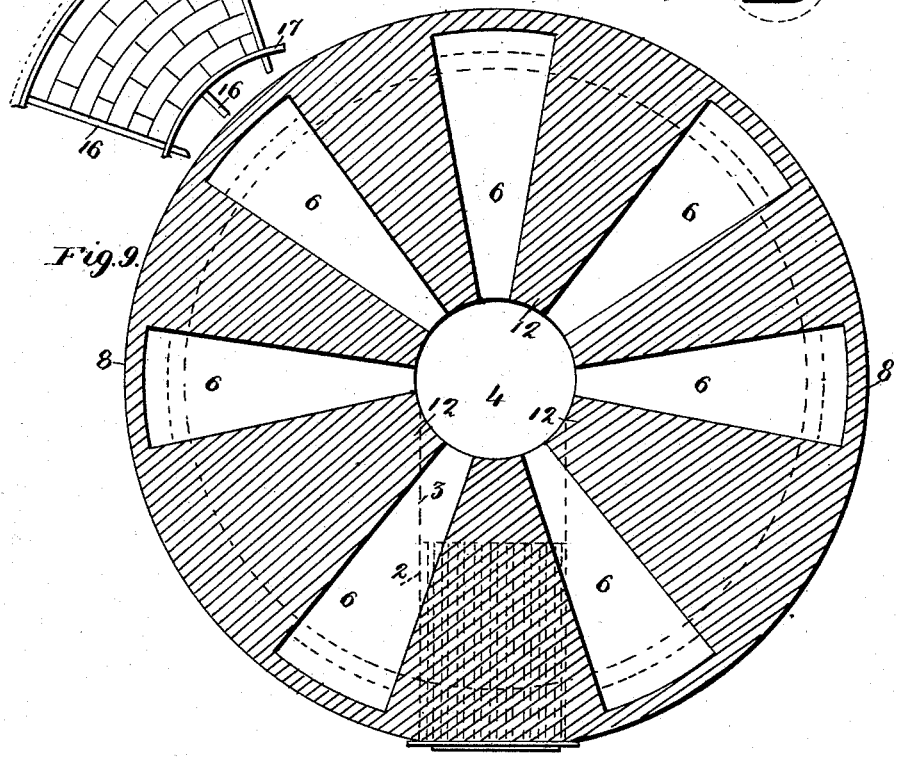
Witnesses  Inventor
  J. J. Pfenninger.
By his Attorneys,

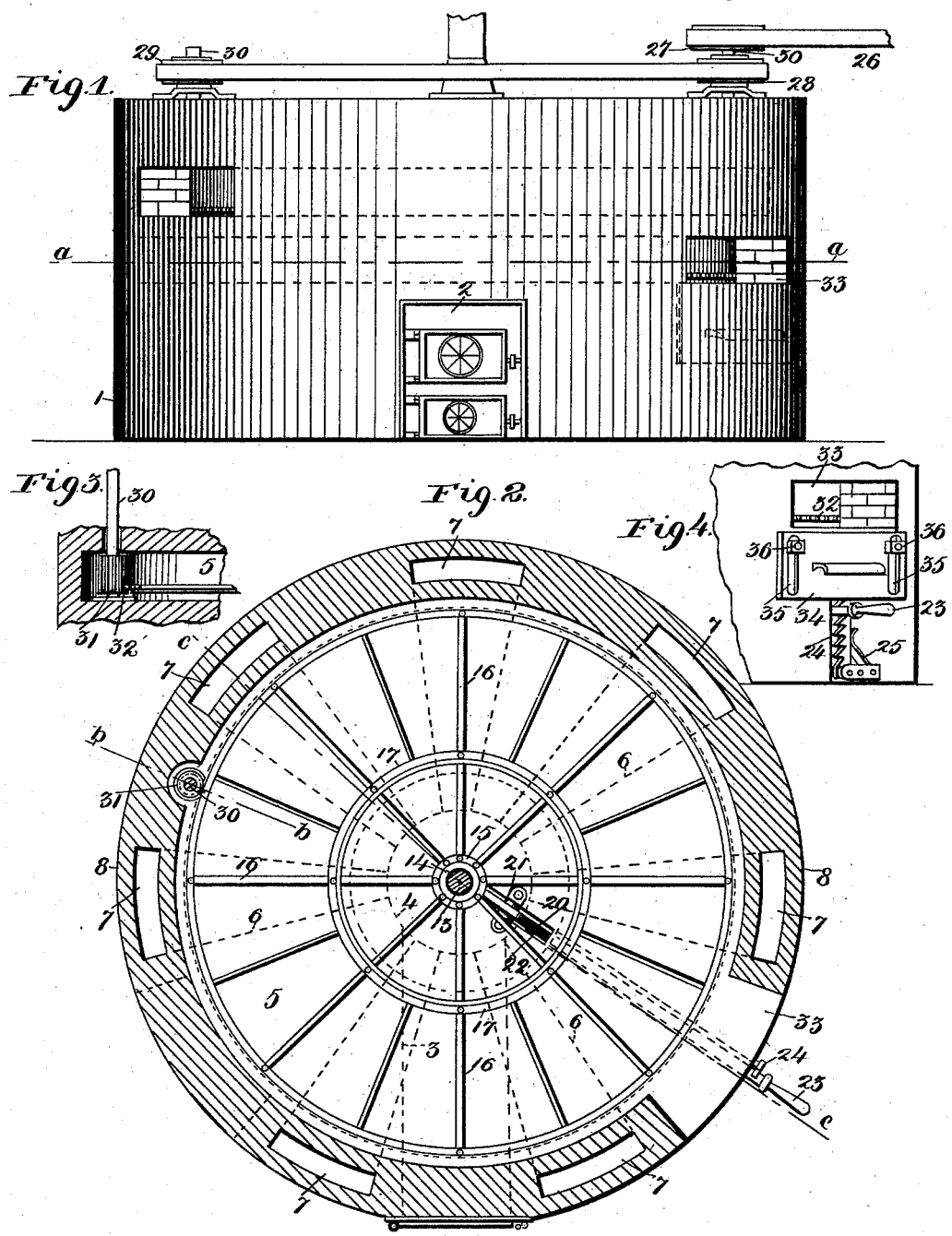

UNITED STATES PATENT OFFICE.

JOHN JACOB PFENNINGER, OF ST. LOUIS, MISSOURI.

BAKE-OVEN.

SPECIFICATION forming part of Letters Patent No. 523,005, dated July 17, 1894.

Application filed April 23, 1894. Serial No. 508,596. (No model.)

*To all whom it may concern:*

Be it known that I, JOHN JACOB PFENNINGER, of the city of St. Louis, State of Missouri, have invented certain new and useful Improvements in Bake-Ovens, of which the following is a full, clear, and exact description, reference being had to the accompanying drawings, forming a part hereof.

My invention has relation to improvements in bake ovens and consists in the novel arrangement and combination of parts more fully set forth in the specification and pointed out in the claims.

In the drawings, Figure 1 is an elevation of my improved oven. Fig. 2 is a section on the line $a$—$a$ of Fig. 1, said section being taken through the baking compartment. Fig. 3 is a section on the line $b$—$b$ of Fig. 2. Fig. 4 is a detail showing the sliding door adapted to cover the working opening or space leading from the baking compartment. Fig. 5 is a vertical section taken on the line $c$—$c$ of Fig. 2. Fig. 6 is a detail of the middle portion of the vertically moving frame and carrier of the baking compartment and one end of the lever co-operating therewith. Fig. 7 is a detail plan view of the forked supporting end of the lever for elevating the carrier. Fig. 8 is a plan of a section of the carrier frame provided with brick; and Fig. 9 is a section taken on the line $d$—$d$ of Fig. 5.

The object of my invention is to construct a circular or polygonal bake oven whose heating flues shall be so disposed with reference to the baking compartment that the heat imparted to the latter shall be even and homogeneous throughout its entire surface thus making the products of said oven characteristically homogeneous and constant in quality. In connection with such an oven I have devised a rotating carrier operating within the baking compartment, which while rotating can be lowered or elevated at will so as to bring the goods placed thereon in variable relation with respect to the upper and lower walls of the baking compartment. I have further devised a door which shall prevent the escape of the heat from the bottom of the carrier through the working opening of the baking compartment whatever be the elevation of the carrier with respect to the bottom or lower edge of such opening.

In detail the invention can be described as follows:

Referring to the drawings, 1 represents the bottom of the oven having at a convenient point therein a fire box 2 from which leads a passage 3 to a centrally disposed vertical chamber or flue 4. From said chamber there pass radially outward and beneath the lower solid wall of the baking compartment 5 a series of segmental horizontally disposed radial flues 6 whose expanded outer ends lead each to an up take flue 7 located in the solid outer wall 8 of the oven. From the up take flues there lead a corresponding series of horizontal flues 9 on top of the baking compartment to a superposed chamber 10 communicating with a common exit flue 11. The flues 6 and 9 are separated by and the baking compartment floor is supported by the radial division walls 12 as best shown in Fig. 9.

In Fig. 1 I have shown two baking compartments superposed one over the other, said compartments being both encompassed if desirable by the series of flues above described, although when two baking compartments are used I deem it preferable to qualify the disposition of the flues as will appear more fully in a subsequent application for Letters Patent.

Centrally secured to the lower and upper wall of the baking compartment in any mechanical manner is a rigid spindle 13 about which passes loosely a sliding collar 14 to the flange 15 of which are secured and from which extend radially a series of rods 16 reinforced at a suitable point by the circular band 17 and at their outer ends connected by a rim 18, the whole constituting a rotating carrier for the bake pans. In Fig. 8 I have shown a section of such carrier filled in by brick on which the articles to be baked can be placed. The circular carrier is adapted to rotate within the baking compartment about the spindle 13. In its rotation the carrier is supported by the flange 15 of the collar resting upon the curved bearing surfaces of the fork 19 embracing the spindle below the flange, said fork forming the free end of the short arm of a bent lever 20 pivoted at 21 on the floor of the baking compartment, the long arm of the lever operating within the cut out portion 22 of the oven bottom, and the operating handle 23 of said lever passing out of the oven as best shown in Figs. 2 and 5. It will be seen that as the long arm of the lever is depressed the fork will be elevated, thus raising the carrier along its spindle, and vice versa. When once raised to any desirable position the parts are retained by the teeth of the spring operated pivoted rack bar 24 holding the arm 23 in the desired position. To restore or lower the carrier the bar is pulled back sufficiently to overcome the resiliency of the spring 25 so that the handle 23 can be freely elevated, by such operation lowering the carrier to its lowest or lower position.

The carrier is rotated by any suitable machine power, the one shown in Fig. 1 being a driving belt 26 and pulley 27, the connected pulleys 28 and 29, from each of which depends a driving shaft 30 carrying an elongated pinion 31 meshing with the teeth 32 along the periphery of the carrier in any of its elevated positions in the baking compartment. As the carrier is rotated the goods located thereon come successively opposite the working opening 33 of the baking compartment. It is to be understood that in the baking of bretzels these spaces 33 are open, and to prevent too much heat from escaping from the bottom of the carrier in any of its variably elevated positions, it is essential to have a door located contiguous to the opening and one which can slide up and down to follow the positions of the carrier. I have therefore designed a door 34 having slotted openings 35 through each of which passes a bolt capped by a nut 36. The door can thus be slid up and down and when once in position can be securely fastened by the nuts 36 capping the bolts.

The object of varying the elevation of the carrier within the baking compartment is to evenly distribute the heat above and below the goods placed thereon, the elevation being determined by practice according to the condition and temperature of the flues imparting heat to the baking compartment. If the upper flues should be for any reason cooler than the lower ones the position of the carrier would be different than if the flues were of the same temperature, or if the lower flues should cool a little below the upper ones.

While the carrier is rotating it is of course essential that the same be lowered or raised without the binding of the parts and it is found that the specific construction of the lever here used for that purpose is a most convenient form, the curved surfaces of the forked end of the lever allowing easy rotation of the carrier.

The arrangement of flues here shown gives a very thorough and homogeneous distribution of heat to all parts of the baking compartment and thus insures a constant and superior product baked therein.

Nothing has been said as to the disposition of dampers as these can be placed to suit the conditions of the oven and the character of the article to be baked.

Having described my invention, what I claim is—

1. A polygonal bake oven comprising a fire box, a flue leading therefrom, a series of segmental radially expanding flues communicating with said latter flue, an up-take flue for each radial flue at its expanded outer end, a corresponding series of radial flues leading from the up-take flues, a suitable exit flue, and a baking compartment located between the walls of the radial flues, substantially as set forth.

2. A polygonal bake oven comprising a fire box, a central chamber or flue communicating therewith, a series of radially disposed and outwardly expanding horizontal flues communicating therewith, an up-take flue from each radial flue communicating with its expanded end, a horizontal series of corresponding radial flues leading from the upper ends of the up-take flues and terminating in a common chamber, an exit flue leading from said chamber, a baking compartment having one or more working openings, located between the solid walls of the horizontal flues and the vertical walls of the up-take flues, substantially as set forth.

3. A bake oven having a polygonal baking compartment, a series of radially disposed flues expanding from the center toward the periphery located below and above the same, a fire box, suitable connecting flues for the radial flues, and an exit flue, substantially as set forth.

4. A bake oven having a suitable baking compartment, one or more suitable working openings in said compartment, suitable sliding doors for varying the size of said openings, a rotating carrier in said compartment and means for varying the elevation of said carrier during the rotation of the same, substantially as set forth.

5. In a bake oven, a suitable baking compartment, one or more working openings for said compartment, a rotating carrier for said baking compartment, means for elevating said carrier, and a sliding door adapted to be raised or lowered with the corresponding movement of the carrier, and co-operating with the opening of said baking compartment, substantially as set forth.

6. In a bake oven, a suitable baking compartment, a fixed spindle in said compartment, a sliding collar embracing said spindle and adapted to rotate about the same, a carrier secured to said collar, means for rotating said carrier, and suitable means for elevating or lowering said carrier within said baking compartment, substantially as set forth.

7. In a bake oven having a suitable carrier, a pivoted lever for supporting said carrier, curved supporting surfaces at the end of the short arm of said lever on which the carrier is adapted to rest, and a spring operated pivoted rack bar co-operating with the handle or long arm of the lever for keeping the same in any desired position, substantially as set forth.

8. In a bake oven, a suitable baking compartment, a rotating carrier within the same adapted to be raised or lowered within the compartment, peripheral teeth on said carrier, and an elongated pinion meshing with said teeth and adapted to co-operate with the carrier in any of its variable positions, substantially as set forth.

9. In a bake oven, a baking compartment having a suitable working opening, a sliding door co-operating with said opening, suitable slots in said door, bolts passing through said slots, and terminal nuts on said bolts for securing said door, substantially as set forth.

10. A polygonal bake oven comprising a fire box located at the periphery of the same, a central flue or chamber communicating therewith, one or more radial and outwardly expanding flues extending from said chamber, and a suitable exit flue for said radial flues, substantially as set forth.

In testimony whereof I affix my signature in the presence of two witnesses.

JOHN JACOB PFENNINGER.

Witnesses:
   JAMES J. O'DONOHOE,
   EMIL STAREK.